(No Model.)

J. H. MEYER.
ATTACHMENT FOR BICYCLES.

No. 591,864. Patented Oct. 19, 1897.

WITNESSES

INVENTOR
Joseph H. Meyer
BY Edgar Tate & Co
ATTORNEYS.

UNITED STATES PATENT OFFICE.

JOSEPH HERMANN MEYER, OF BROOKLYN, NEW YORK.

ATTACHMENT FOR BICYCLES.

SPECIFICATION forming part of Letters Patent No. 591,864, dated October 19, 1897.

Application filed February 4, 1897. Serial No. 622,044. (No model.)

*To all whom it may concern:*

Be it known that I, JOSEPH HERMANN MEYER, a citizen of the United States, residing at Brooklyn, in the county of Kings and State of New York, have invented certain new and useful Improvements in Attachments for Bicycles, of which the following is full and complete specification, such as will enable those skilled in the art to which it appertains to make and use the same.

This invention relates to bicycles and similar vehicles; and the object thereof is to provide an improvement in vehicles of this class by means of which the fork in which the forward or guide wheel is mounted may be prevented from turning when the hands are removed from the handle-bar or when pressure on the handle-bar is removed.

The invention is fully disclosed in the following specification, of which the accompanying drawings form a part, and in which the separate parts of my improvement are designated by the same numerals of reference in each of the views, and in which—

Figure 1:
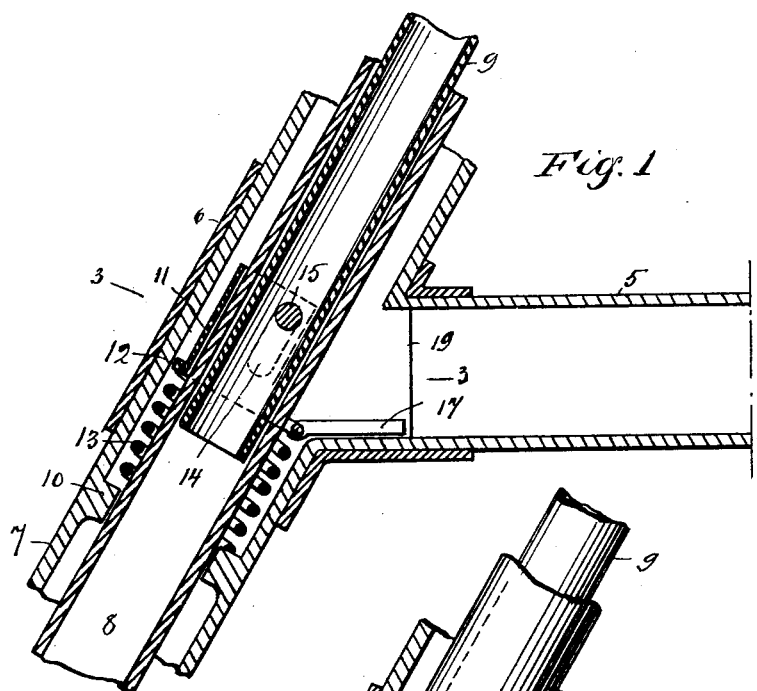
Figure 2:
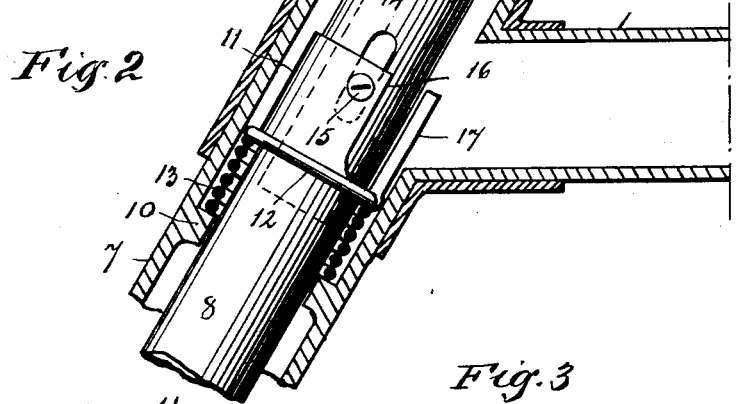

Figure 1 is a central vertical section of a part of the frame of a bicycle and showing my improvement, the improvement being also in section; Fig. 2, a similar view showing a part of the frame in section and showing my improvement in full lines, and Fig. 3 a section on the line 3 3 of Fig. 1.

In the drawings forming part of this specification, I have shown, at 5, a part of the upper, horizontal, tubular rod of the frame of a bicycle which is provided with the usual tubular coupling 6, through which the tubular head 7, which forms a part of the frame, passes, and I have also shown, at 8, a part of the tubular stem of the forward fork of the vehicle in which the guide-wheel is mounted, said fork and said wheel not being shown, and mounted in and longitudinally movable in the upper part of the tubular stem 8, is a part of a tubular rod 9, which forms the support of the handle-bar, which is not shown.

Formed in the tubular head 7, at a predetermined point below the tubular coupling 6, with which the tubular rod 5 is connected, is an annular inwardly-directed shoulder or projection 10, and mounted on the stem 8 is a sliding sleeve 11, which is provided at its lower end with an annular flange or shoulder 12, and mounted between said sleeve and the inwardly-directed annular shoulder 10 is a spiral spring 13.

Figure 3:
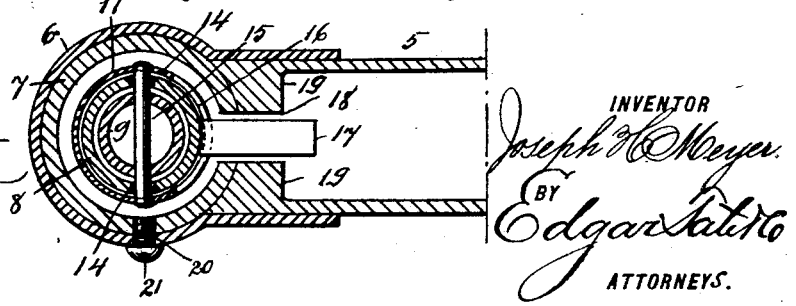

The tubular stem 8 is provided in its opposite side with longitudinal slots 14, which are shown in full lines in Figs. 2 and 3 and in dotted lines in Fig. 1, and passing through said slots, and through the tubular rod 14 and the sleeve 11, is a pin or bolt 15.

The sleeve 11 is cut away longitudinally on the side thereof adjacent to the tubular rod 5, as shown at 16, in Figs. 2 and 3, and pivotally connected with the annular flange or shoulder 12, or hinged thereto, is a jaw 17, and when the tubular rod 9 is depressed the jaw 17 is folded adjacent to the side of the tubular stem 8 of the forward fork, as shown in Fig. 2, and the said stem and the fork connected therewith may be turned in the usual manner by means of the handle-bar, and the vehicle may be guided, as will be readily understood, by simply turning the handle-bar, but whenever it is desired to lock the forward fork, so as to prevent the same from turning, and so as to enable the vehicle to proceed in a straight line, the pressure on the handle-bar is removed and the tubular rod 9 is raised by the spring 13 and the jaw 17 is projected through an opening 18, which is formed by means of inwardly-directed shoulders or projections 19 at the point where the tubular rod 5 is connected with the tubular coupling 6, and in this position of the parts the forward fork will be securely held and prevented from turning, and the guide-wheel will be held in line with the drive-wheel of the vehicle, and the vehicle will proceed in a straight line.

It will be apparent that this device may be operated at any time by depressing the handle-bar or the rod 9, connected therewith, so as to guide the vehicle or turn the forward fork in which the guide-wheel is mounted, and whenever this pressure is removed from the rod 9 or the handle-bar, the spring 13 will force the rod 9 upwardly, and the jaw 17 will be projected, as shown in Fig. 3, and the forward fork will be locked, so as to hold the guide-wheel in line with the drive-wheel of the vehicle.

Although I have shown my improvement applied to what is known as a "diamondframe" bicycle, it will be apparent that it may be applied to a bicycle of any desired form or construction, and also to a ladies' vehicle of this class, and I also form in the tubular coupling 6 and in the tubular head 7 of the frame holes or openings 20, by means of which the pin or bolt 15 may be inserted or removed, and these holes or openings are adapted to be closed by a screw-threaded plug 21.

This device is simple in construction and operation, and is perfectly adapted to accomplish the result for which it is intended.

Having fully described my invention, I claim as new and desire to secure by Letters Patent—

1. The combination with a bicycle of a sliding sleeve secured to the tubular post of the handle and adapted to slide therewith, a plate pivotally connected with one side of said sleeve and adapted to engage a slot or groove formed in a head which is inserted in the end of the horizontal tube of the frame, said plate being adapted to be disengaged from said groove by pressing down the handle-bar, substantially as and for the purpose set forth.

2. The combination with the tubular head of the forward part of the frame of a bicycle, through which the stem of the forward fork passes, of a spring-operated sleeve mounted on said stem, and adapted to be forced upwardly, a rod which forms a support for the handle-bar and which is slidably connected with the upper end of said stem, by means of a pin which is also secured to said sleeve, said stem being provided with slots through which the said pin passes, said sleeve and the frame of the vehicle being also provided with means for locking the parts together so as to prevent the fork in which the guide-wheel is mounted from turning, consisting of a jaw which is hinged to said sleeve, and which is adapted to be projected through an opening when the said sleeve is in a predetermined position, and held in place when so projected by side walls or projections, substantially as shown and described.

In testimony that I claim the foregoing as my invention I have signed my name, in presence of the subscribing witnesses, this 30th day of January, 1897.

JOSEPH HERMANN MEYER.

Witnesses:
  C. GERST,
  A. C. VAN BLARCOM.